US011775839B2

(12) United States Patent
Mass et al.

(10) Patent No.: US 11,775,839 B2
(45) Date of Patent: Oct. 3, 2023

(54) FREQUENTLY ASKED QUESTIONS AND DOCUMENT RETRIEVAL USING BIDIRECTIONAL ENCODER REPRESENTATIONS FROM TRANSFORMERS (BERT) MODEL TRAINED ON GENERATED PARAPHRASES

(71) Applicant: International Business Machines Corporation, Armonk, NY (US)

(72) Inventors: Yosi Mass, Ramat Gan (IL); Boaz Carmeli, Koranit (IL); Haggai Roitman, Yoknea'm Elit (IL); David Konopnicki, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 369 days.

(21) Appl. No.: 16/897,538

(22) Filed: Jun. 10, 2020

(65) Prior Publication Data

US 2021/0390418 A1     Dec. 16, 2021

(51) Int. Cl.
*G06F 16/245*       (2019.01)
*G06N 3/088*        (2023.01)
*G06F 16/2457*      (2019.01)
*G06N 3/045*        (2023.01)

(52) U.S. Cl.
CPC ....... *G06N 3/088* (2013.01); *G06F 16/24578* (2019.01); *G06N 3/045* (2023.01)

(58) Field of Classification Search
CPC . G06N 3/088; G06N 3/0454; G06F 16/24578
See application file for complete search history.

(56) References Cited

U.S. PATENT DOCUMENTS

| 2005/0097067 | A1* | 5/2005 | Kirshenbaum | G06F 18/254 706/46 |
| 2008/0040339 | A1* | 2/2008 | Zhou | G06F 16/3334 707/999.005 |
| 2021/0049213 | A1* | 2/2021 | Zhang | G06F 18/214 |
| 2021/0133264 | A1* | 5/2021 | Tiwari | H04L 51/02 |

(Continued)

FOREIGN PATENT DOCUMENTS

| CN | 103902652 A | | 2/2014 | |
| CN | 111198940 A | * | 5/2020 | G06F 16/3329 |

OTHER PUBLICATIONS

Sakata et al., "FAQ Retrieval using Query-Question Similarity and BERT-Based Query-Answer Relevance", May 24, 2019, arXiv: 1905.02851v2 (Year: 2019).*

(Continued)

*Primary Examiner* — Hosain T Alam
*Assistant Examiner* — Robert F May
(74) *Attorney, Agent, or Firm* — Barry D. Blount

(57) ABSTRACT

An example system includes a processor to receive a query. The processor can retrieve ranked candidates from an index based on the query. The processor can re-rank the ranked candidates using a Bidirectional Encoder Representations from Transformers (BERT) query-question (Q-q) model trained to match queries to questions of a frequently asked question (FAQ) dataset, wherein the BERT Q-q model is fine-tuned using paraphrases generated for the questions in the FAQ dataset. The processor can return the re-ranked candidates in response to the query.

14 Claims, 11 Drawing Sheets

(56) References Cited

U.S. PATENT DOCUMENTS

2021/0157845 A1* 5/2021 Dodel .................. G06N 3/08
2021/0157861 A1* 5/2021 Katzman ............... G06F 16/93

OTHER PUBLICATIONS

Xiong, Chenjan, "Knowledge Based Text Representations for Information Retrieval", May 2016, Language Technologies Institute School of Computer Science Carnegie Mellon University (Year: 2016).*

Padaki et al. "Rethinking Query Expansion for BERT Reranking", Apr. 2020, Advances in Information Retrieval: 42nd European Conference on IR Research, ECIR 2020 (Year: 2020).*

Liu et al., "Multi-Task Deep Neural Networks for Natural Language Understanding", May 30, 2019, arXiv:1901.11504v2 (Year: 2019).*

Chung Gan, Wee et al. "Improving the Robustness of Question Answering Systems to Question Paraphrasing," Proceedings of the 57th Annual Meeting of the Association for Computational Linguistic, Aug. 2, 2019, 11 pages. https://www.aclweb.org/anthology/P19-1610.pdf.

Dong, Li et al. "Learning to Paraphrase for Question Answering," GroundAI, Aug. 20, 2017, 14 pages. https://www.groundai.com/project/learning-to-paraphrase-for-question-answering/1.

Karan, Mladen et al. "Paraphrase-focused learning to rank for domain-specific frequently asked questions retrieval," Expert Systems with Applications, Sep. 12, 2017, Abstract 3 pages. https://www.sciencedirect.com/science/article/pii/S095741741730636X.

Sakata, Wataru et al. "FAQ Retrieval using Query-Question Similarity and BERT-Based Query-Answer Relevance," SIGIR'19, Jul. 25, 2019, 4 pages. https://dl.acm.org/doi/10.1145/3331184.3331326.

* cited by examiner

700

FREQUENTLY ASKED QUESTIONS AND DOCUMENT RETRIEVAL USING BIDIRECTIONAL ENCODER REPRESENTATIONS FROM TRANSFORMERS (BERT) MODEL TRAINED ON GENERATED PARAPHRASES

BACKGROUND

The present techniques relate to frequently asked question and document retrieval. More specifically, the techniques relate to querying frequently asked questions or documents using neural networks.

SUMMARY

According to an embodiment described herein, a system can include processor to receive a query. The processor can also further retrieve ranked candidates from an index based on the query. The processor can also re-rank the ranked candidates using a Bidirectional Encoder Representations from Transformers (BERT) query-question (Q-q) model trained to match queries to questions of a frequently asked question (FAQ) dataset, wherein the BERT Q-q model is fine-tuned using paraphrases generated for the questions in the FAQ dataset. The processor can also further return the re-ranked candidates in response to the query.

According to another embodiment described herein, a method can include generating, via a processor, question paraphrases based on question-answer pairs of an FAQ dataset. The method can further include filtering, via the processor, the question paraphrases by running the question paraphrases against an index of the FAQ dataset. The method can also further include fine-tuning, via the processor, a Bidirectional Encoder Representations from Transformers (BERT) query-question (Q-q) model based on the filtered question paraphrases.

According to another embodiment described herein, a computer program product for ranking query candidates can include computer-readable storage medium having program code embodied therewith. The computer readable storage medium is not a transitory signal per se. The program code executable by a processor to cause the processor to generate question paraphrases based on question-answer pairs of a frequently asked question (FAQ) dataset. The program code can also cause the processor to filter the question paraphrases by running the question paraphrases against an index. The program code can also cause the processor to fine-tune a Bidirectional Encoder Representations from Transformers (BERT) Query-question (Q-q) model based on the filtered paraphrases.

DETAILED DESCRIPTION

Figure 1:
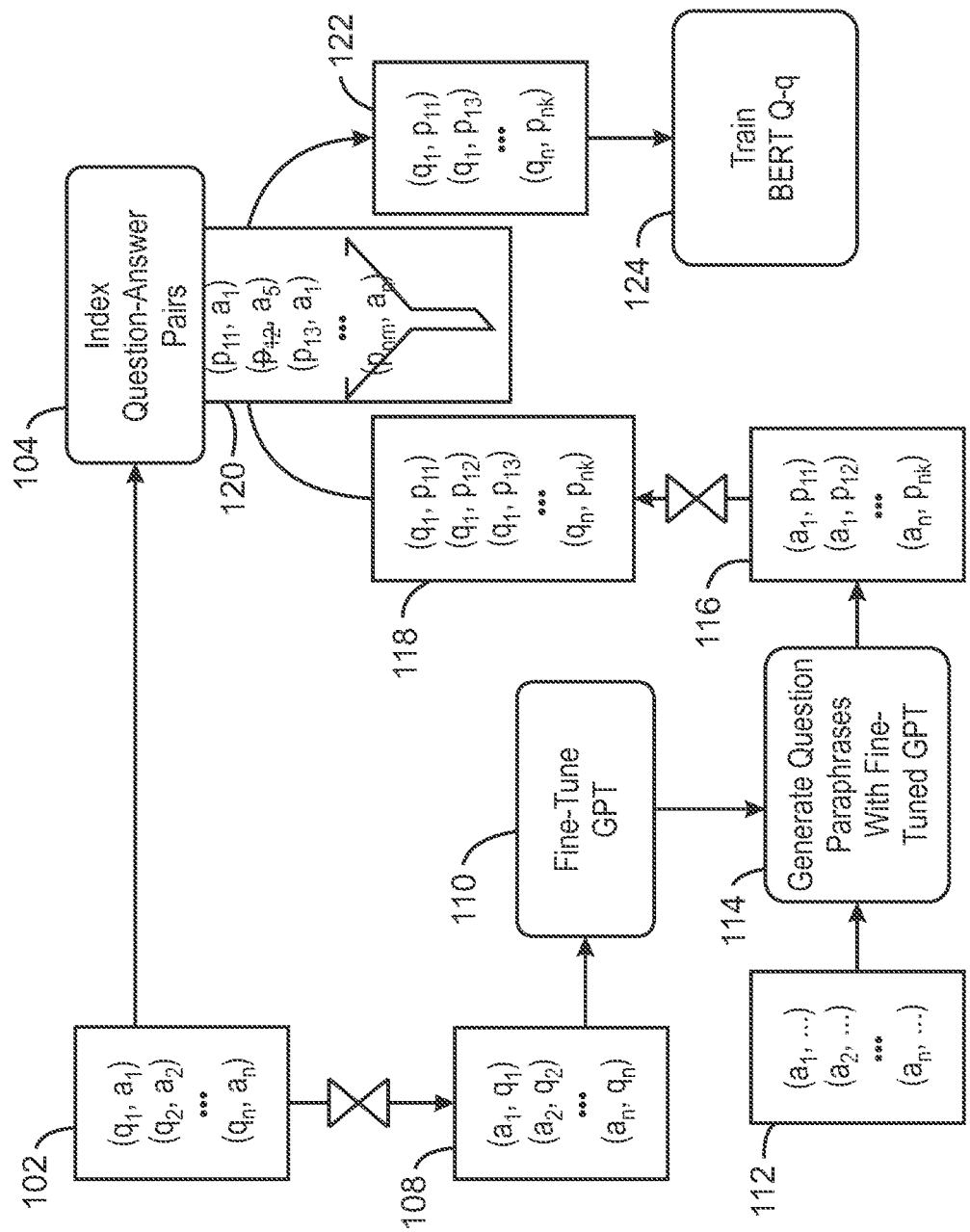
FIG. 1 is a process flow diagram of an example process for training a Bidirectional Encoder Representations from Transformers (BERT) query-question (Q-q) model using generated question paraphrases.

Many websites and online communities publish Frequently Asked Questions (FAQs) to help users find relevant answers to common questions. An FAQ dataset may include pairs of questions and answers. As used herein, a question refers to a question within any given FAQ pair and is denoted using a lowercase q. Similarly, as used herein, an answer refers to a particular answer in any given FAQ pair and denoted using a lowercase a. For example, each question in an FAQ dataset may be paired with one answer. In some examples, multiple instances of the same question may paired with different answers. In order to retrieve an appropriate FAQ for information, a user may submit a query. As used herein, a query refers to an issued user query and denoted using an uppercase Q. In various examples, a query may be matched against the questions or the answers in a given FAQ dataset. For example, searching over FAQ may use multi-field indexing and retrieval. Hence, a user query Q may be matched with either the question field q, the answer field a, or a concatenated question and answer q+a field. Furthermore, the association of questions to answers in the FAQ can be utilized for training neural models to predict the similarity between user queries and answers. However, FAQ pairs by themselves do not provide the required labeled data for training a model to predict the association between user queries and FAQ questions. Therefore, a labeled dataset with user queries Q and their matching FAQ pairs may be required for supervised learning. Such a dataset is usually manually generated or obtained from query-log mining. However, the construction of such a dataset either requires domain expertise, such as enriching the dataset with manually generated question paraphrases, or assumes the availability of query-logs. Such datasets may not always be available and manually labeling training data may be time consuming and costly.

Whenever such a dataset is unavailable, unsupervised retrieval models may be utilized instead for query to question matching. Unsupervised FAQ retrieval models may utilize information retrieval techniques. For example, such information retrieval techniques may include lexical and semantic text matching, query expansion, etc. However, such unsupervised retrieval models may be not as accurate in retrieving the best FAQ question-answer pairs.

According to embodiments of the present disclosure, a system includes a processor to receive a query. The processor can retrieve ranked candidates from an index based on the query. The processor can re-rank the ranked candidates using a Bidirectional Encoder Representations from Transformers (BERT) query-question (Q-q) model fine-tuned to match queries to questions of a frequently asked question (FAQ) dataset. As used herein, a BERT model is a model that is generally pretrained on a large data set and then fine-tuned for another purpose using a more specific dataset. The BERT Q-q model is fine-tuned using paraphrases generated for the questions in the FAQ dataset. For example, the paraphrases may be semantically similar to, yet different from, an associated questions in the FAQ dataset. The processor can display the re-ranked candidates in response to the query. In some examples, one or more additional models may be used to re-rank the ranked candidates and the scores of the additional models may be combined to generate a final re-ranking for greater accuracy. For example, these models may include a BERT query-answer (Q-a) model and a passage-based re-ranker. In various examples, a system may use similar techniques to retrieve documents. For example, the questions may be represented as titles of documents and the answer may be represented as abstracts of documents. A BERT query-title (Q-t) model may be similarly trained to re-rank retrieved documents. Thus, embodiments of the present disclosure allow FAQ datasets and documents to be queried using a model trained using only the FAQ datasets or document sets and without the use of user queries for training. In particular, the embodiments include utilizing weak-supervision by generating question paraphrases from the FAQ pairs or title paraphrases from document sets and training a BERT Query-question model based on the generated question paraphrases or a BERT query-title model based on the generated title paraphrases. In some examples, the embodiments also enable an improved BERT model by also filtering the question paraphrases or title paraphrases used to train the BERT model. In experiments performed on two datasets, the unsupervised techniques described herein outperformed existing supervised methods on the first dataset. On the other dataset, the unsupervised techniques described herein achieved almost the same results as the best supervised method, with values of 0.76, 0.89 and 0.91 for P@5, MAP and MRR, respectively, compared with values of 0.78, 0.90 and 0.94, respectively, by the best supervised method.

With reference now to FIG. 1, a block diagram shows an example process for training a Bidirectional Encoder Representations from Transformers (BERT) query-question (Q-q) model using generated question paraphrases. The example process 100 can be implemented using the process 400 of FIG. 4 or the method 600 of FIG. 6. In various examples, the process 100 can be implemented via the processor 802 of the computing system 800 or the processor 1102 of the computer readable medium 1100 of FIGS. 8 and 11. In various examples, the process 100 may also be used to train a BERT query-title (Q-t) model for document retrieval using generated title paraphrases.

At block 102, a set of question-answer pairs are received. For example, the question-answer pairs may be received from a frequently asked question (FAQ) dataset. In some examples, the question-answer pairs may be title-abstract pairs. For example, documents may have three fields, including a title, an abstract, and content. In some examples, if a document is missing a title, then the first sentence of the document may be considered an augmented title and used as a title. In some examples, if the document is missing an abstract, then a first number of words may be used as an abstract. For example, the first 512 words of a documents content may be used as an abstract. Thus, in some examples, a title of a document title may be represented as a question and the abstract of a document may be represented as an answer.

At block 104, the set of question-answer pairs are indexed. For example, the answer-question pairs maybe indexed using an inverted index, such as the Elasticsearch search engine released February 2010. For example, an inverted index may be a database index storing a mapping from content, such as words or numbers, to its locations in a table, or in a document or a set of documents. In various examples, the question-answer pairs are indexed as documents each containing three fields, including a question (q) field, an answer (a) field, and a concatenated question and answer (q+a) field. In some examples, the inverted index may include a set of title-abstract pairs.

At block 108, a set of answer-question pairs are generated based on the set of question-answer pairs. For example, the question-answer pairs may be inverted to generate the set of answer-question pairs. In some examples, title-abstract pairs may be inverted to generate the set of abstract-title pairs.

At block 110, a generative pre-training (GPT) neural network model is fine-tuned based on the answer-question pairs. For example, the generative pre-training model may be the GPT-2 model released February 2019. The GPT-2 model is pre-trained on huge bodies of text, capturing the natural language structure and producing deeply coherent text paragraphs. In various examples, the GPT model may be fine-tuned by concatenating the question-answer pairs with special tokens and sampling sequences of consecutive tokens and maximizing a conditional probability of a word to appear next in the sequence. For example, an end-of-sequence (EOS) special token may be used to separate FAQ question-answer pairs, and a separator (SEP) special token may be used to separate answers from questions inside each question-answer pair. As one example, a training set $D_{train} = (a_i, q_i)$ may be structured with each answer before its question. The FAQ pairs $(q_i, a_i)$\ may be concatenated into a long text $U = a_1$ SEP $q_1$ EOS . . . $a_n$ SEP $q_n$ EOS, where answers precede their questions, having EOS and SEP as special tokens. The GPT-2 fine-tuning samples a sequence of a predetermined number of l consecutive tokens from the text U and maximizes the conditional probability $P(w^j | w^{j-1}, \ldots w^{j-1})$ of $w^j$ to appear next in the sequence. In various examples, the sampling and maximization of the conditional probability may be repeated several times. In some examples, generative pre-training (GPT) neural network model is similarly fine-tuned based on title-abstract pairs.

At block 112, answers are extracted from the set of answer-question pairs. The extracted answers may then be input into the trained GPT. In some examples, abstracts may be similarly extracted from a set of title-abstract pairs.

At block 114, question paraphrases are generated for each of the extracted answers using the fine-tuned GPT model. For example, once the GPT model is fine-tuned, the fine-tuned GPT may be fed with the text "a SEP", where "a" is an answer in an FAQ pair (q, a), and let the trained GPT generate tokens until EOS. In some examples, all the generated tokens until EOS may be used as a paraphrase to answer a's question q. In various examples, any number of question paraphrases may be generated by repeating this generation process. As one example, the paraphrase "Is there a way to deactivate my account on MySocialMedia?" may be generated for the question "How do I delete my MySocialMedia account?" In some examples, abstract paraphrases may be generated for each of a set of extracted abstracts using the fine-tuned GPT model.

At block 116, a set of answer-paraphrase pairs are generated. For example, each of the question paraphrases may be paired with the answer used to generate the question-paraphrase pairs. In some examples, a set of abstract-paraphrase pairs maybe similarly generated.

At block 118, question-paraphrase pairs are generated based on the answer-paraphrase pairs. For example, the answers of each of the answer-paraphrase pairs may be replaced with associated questions using the answer-question pairs 102. In some examples, title-paraphrase pairs may be similarly generated based on the abstract-paraphrase pairs.

At block 120, the question-paraphrase pairs are filtered using the index 204. The generated question paraphrases are weakly-supervised dataset generated from the FAQ pairs. One obstacle in using weakly-supervised generated text generally is the noise that using such generated text may introduce. To overcome this problem, the generated paraphrases may be filtered by running paraphrase p of question q against the index 204 and keeping only those paraphrases that return exactly the same FAQ pairs that have q as their question. In some examples, the paraphrases that passed the first filter may be further sorted by the score of the top returned (q, a) pair, when run against the index 204. In some examples, title-paraphrase pairs may be similarly filtered using the index 204.

At block 122, a filtered set of question-paraphrase pairs is output. For example, in FIG. 1, the question paraphrase $p_{12}$ was filtered out of the filtered set of question phrases. In some examples, a filtered set of title-paraphrase pairs may be similarly output.

At block 124, a BERT Q-q model is trained using the filtered set of question-paraphrase pairs. In some examples, similar to the BERT-Q-a model, BERT Q-q model may be fine-tuned using triplets (p, q, q'), where p is a paraphrase of question q, and q' is a randomly selected question from the FAQ questions. In various examples, several strategies can be applied to select N negative examples for each positive example (q, $a_i$). For example, a first strategy includes selecting the N negative examples randomly from $R_q$. In some examples, another strategy to select N negative examples includes selecting the highly scored examples from $R_q$, since such examples will challenge the BERT-Q-a model to learn small nuances between very close answers. In some examples, a BERT Q-t model may be similarly trained using a filtered set of title-paraphrase pairs.

The process flow diagram of FIG. 1 is not intended to indicate that the operations of the process 100 are to be executed in any particular order, or that all of the operations of the process 100 are to be included in every case. Additionally, the process 100 can include any suitable number of additional operations.

Figure 2:
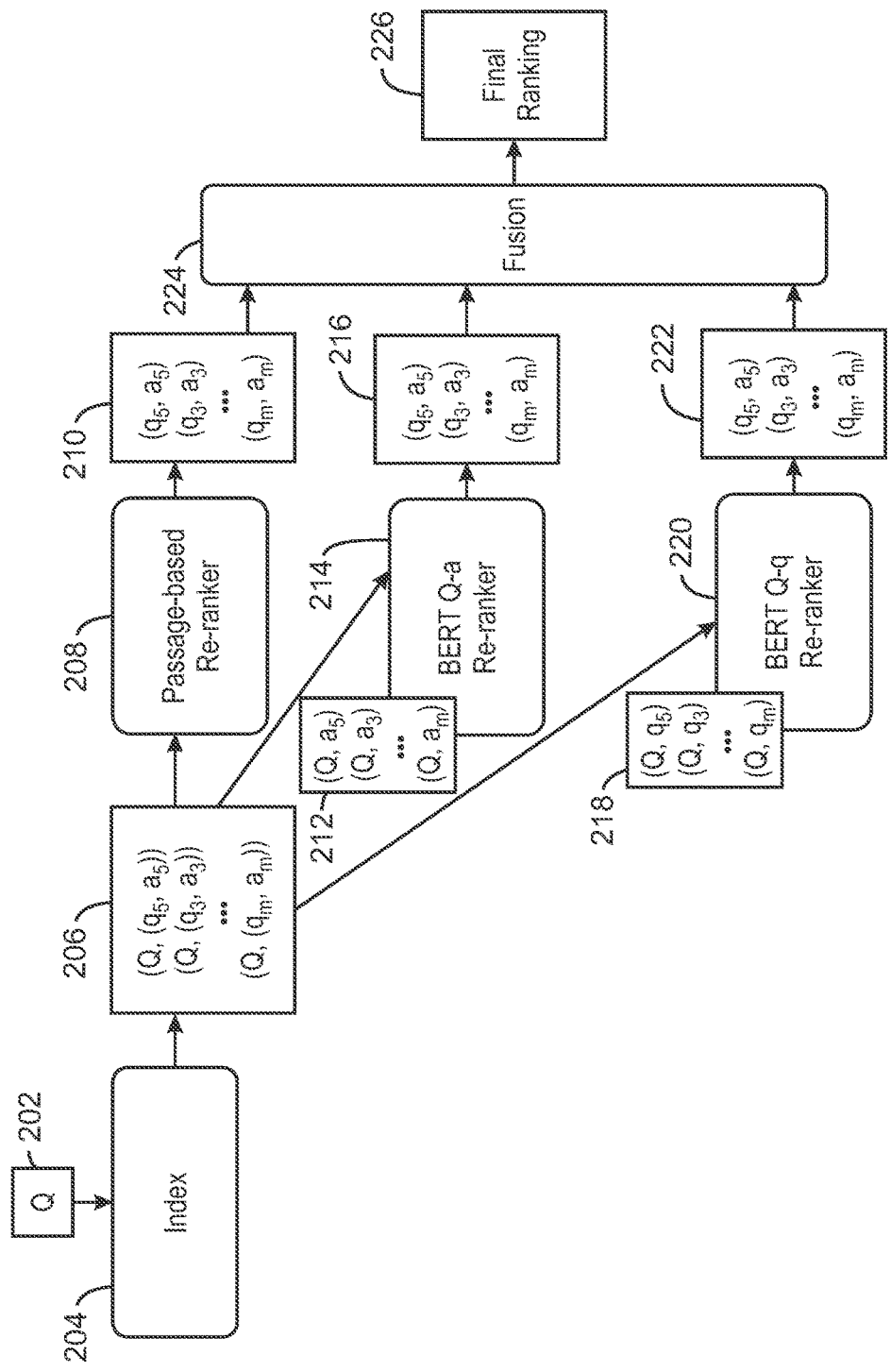
FIG. 2 is a block diagram of an example system for re-ranking candidates of a query using a BERT Q-q model trained on question paraphrases.

FIG. 2, a block diagram shows an example system for re-ranking candidates of a query using a BERT Q-q model trained on question paraphrases. The example system 200 can be trained using the process 100 or the method 600 of FIGS. 1 and 6, and implemented via the processor 802 of the computing system 800 or the processor 1102 of the computer readable medium 1100 of FIGS. 8 and 11.

The system 200 of FIG. 2 includes a query Q shown being received at an index 204. For example, the index 204 may have been generated at block 104 of FIG. 1. The system 200 includes a set of ranked candidates 206 retrieved by the index 204. For example, the ranked candidates 206 may include the query followed by a matched question-answer pair from the index 204. The system 200 further includes a passage-based re-ranker 208 communicatively coupled to the index 204. The passage-based re-ranker 208 is shown generating a first re-ranking 210 of the ranked candidates 206. The system 200 includes a set of query-answer pairs 212 extracted from the ranked candidates 206. The system 200 includes a Bidirectional Encoder Representations from Transformers (BERT) query-answer (Q-a) re-ranker 214 communicatively coupled to the index 204. The BERT Q-a re-ranker 214 is shown generating a second re-ranking 216 of the ranked candidates 204. The system 200 also further includes a BERT query-question (Q-q) re-ranker 220 communicatively coupled to the index 204. The BERT Q-q re-ranker 220 is shown generating scores 222. The system further includes a fusion component 224 communicatively coupled to the passage-based re-ranker 208, the BERT Q-a re-ranker 214, and the BERT Q-q re-ranker 220. The fusion component 224 is shown generating a final ranking 226.

In the example of FIG. 2, the BERT Q-a re-ranker 214 and the BERT Q-q re-ranker 220 may have been trained using the process 100 of FIG. 1. For example, the BERT Q-a re-ranker 214 may have been trained based on question-answer pairs of an FAQ dataset, while the BERT Q-q re-ranker 220 may have been trained using question paraphrases generated using a fine-tuned GPT as discussed herein.

Still referring to FIG. 2, a combination of unsupervised and weakly-supervised re-rankers may be used to re-rank an initial pool of ranked candidates 206 received from the index 204. In various examples, the ranked candidates 206 may be obtained by searching against the index 204 and using a BM25 retrieval. For example, given a user query Q, the query Q is matched using BM25 similarity against the concatenated q+a field and retrieve an initial pool of top-k FAQ candidates, where k is a predetermined number.

In various examples, the passage-based re-ranker 208 applies a focused-retrieval approach, utilizing passages for answer re-ranking. For example, the passage-based re-ranker 208 may be implemented using any suitable information retrieval method. In various examples, the passage-based re-ranker 208 can score the ranked candidates 206 using a maximum-passage approach. For example, the maximum-passage approach may be implemented by running a sliding window (passage) on each candidate's concatenated question and answer q+a field text, and scoring the candidate according to the passage with the highest BM25 similarity to the query Q.

In various examples, the BERT Q-a re-ranker 214 may be fine-tuned to match questions (q) to answers (a). For example, the BERT query-answer (Q-a) model may be trained based on a set of FAQ question-answer pairs. For each question q, positive answers $a_i$ from all the pairs (q, $a_i$) may be extracted. In some examples, there may be a single answer for each FAQ question q. However, in some examples, there may be multiple answers associated for a particular FAQ question q. Negative examples may be randomly selected from those FAQ question-answer pairs that do not have q as their question. In some examples, to further challenge the BERT Q-a model into learning small nuances between close answers, instead of sampling the negative examples from all FAQ pairs, each question q may be run against the concatenated question and answer field of the search index. Negative examples may then be sampled only among the top-k retrieved question-answer pairs that do not have the question q as their question. For example, k may be set to 100. In various examples, each negative examples may be a randomly selected answer from the top-k retrieved pairs excluding those pairs in which q is the question, and hence, is not the answer to q. In various examples, all retrieved answers that are not in the FAQ pairs (q, $a_i$), are used as negative examples. The set of the retrieved answers after excluding the positive answers may be denoted as $R_q$. Unlike some approaches that use a point-wise training, a triplet network may be trained. For example, the BERT Q-a model may be trained using triplets derived from the question-answer pairs. This triplet network may be adopted for BERT fine-tuning using triplets (q, a, a'), where (q, a) constitutes an FAQ pair and a' is a negative sampled answer.

In various examples, given a user query Q 202, the trained BERT Q-a re-ranker 214 re-ranks top-k FAQ ranked candidate pairs by matching the user query Q to the answers (a) only and generating a score indicating closeness of the matching. The BERT Q-a re-ranker 214 thus aims at re-ranking the candidate FAQ pairs 206 according to the similarity between a given user query Q and each pair's answer a.

The BERT-Q-q re-ranker 220 may include a second independent BERT model that is orthogonal to the model of the BERT Q-a re-ranker 214, and is trained to match user queries to FAQ questions. For example, the BERT-Q-q re-ranker 220 is trained by utilizing weak-supervision by generating question paraphrases from the FAQ pairs as described in FIG. 1. The BERT-Q-q re-ranker 220 is then fine-tuned on the questions and their generated paraphrases. At run time, as shown in FIG. 2, given a user query Q 202, the BERT-Q-q re-ranker 220 receives the top-k FAQ candidate pairs 218 and scores each of the candidate pairs by matching the user query Q 202 to the questions (q) only.

The fusion component 224 may be an unsupervised component that combines the rankings 210, 216, and 222 from the passage-based ranker 208, the BERT q-a ranker 214, and the BERT Q-q ranker 220 using a late-fusion method. For example, the late-fusion method may combine the two weakly-supervised fine-tuned BERT models with a baseline information retrieval (IR) method of the passage-based re-ranker 208 using a two-step PoolRank (TSPR) unsupervised pooling method. In some examples, the TSPR may be an extended PoolRank method that estimates document relevance using three ranked lists as pseudo-relevance evidence sources. In some examples, the fusion 224 can calculate a combined score by summing for each candidate pair the scores 210, 216, and 222 that were assigned by the three re-rankers 208, 214, and 220. In various examples, the fusion component 224 can also apply an unsupervised query expansion step for re-ranking a candidate pool of summed candidate scores.

In various examples, a final ranking 226 of final re-ranked candidates can be returned in response to the query. For example, the final ranking 226 may include a top number of re-ranked candidate question-answer pairs may be returned and displayed to a user that submitted the query.

It is to be understood that the block diagram of FIG. 2 is not intended to indicate that the system 200 is to include all of the components shown in FIG. 2. Rather, the system 200 can include fewer or additional components not illustrated in FIG. 2 (e.g., additional re-rankers, or additional indices, etc.). For example, the system 200 may be used for document retrieval. In such example, the questions may be substituted with titles and the question paraphrases substituted with title paraphrases. Similarly, the BERT Q-a ranker 214 may be replaced with a BERT query-abstract re-ranker, and the BERT Q-q re-ranker 220 may be replaced with a fine-tuned BERT query-title (Q-t) re-ranker. In addition, in various examples, any combination of the scores 210, 216, and 222 generated by the re-rankers 208, 214, and 220 may be fused at the fusion component 224 to generate the final ranking 226.

Figure 3:
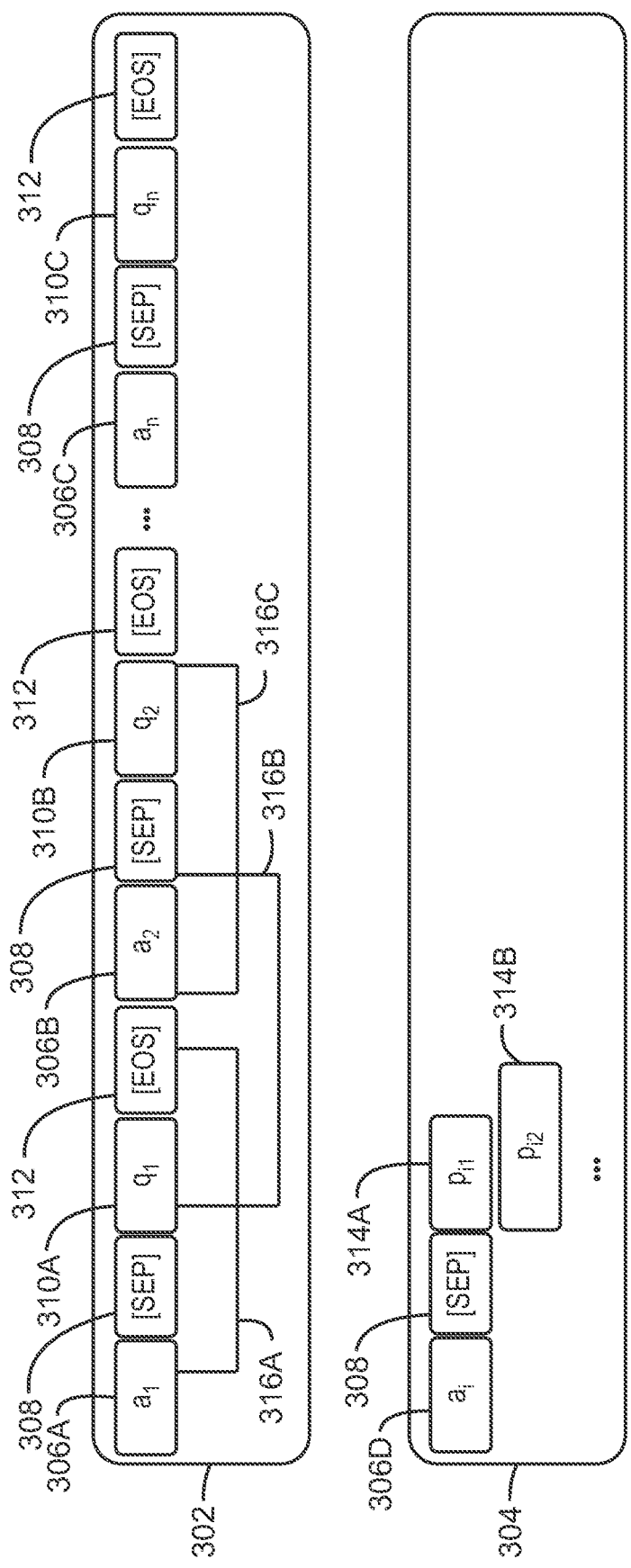
FIG. 3 is a block diagram of an example generation of a set of question paraphrases via a GPT model fine-tuned using an example concatenated set of question-answer pairs.

FIG. 3 is a block diagram of an example generation of a set of question paraphrases via a GPT model fine-tuned using an example concatenated set of question-answer pairs. The example paraphrase generation 300 can be performed using the method 600 of FIG. 6 via the processor 802 of the computing system 800 or the processor 1102 of the computer readable medium 1100 of FIGS. 8 and 11.

FIG. 3 includes a concatenation 302 and a paraphrase generation 304. The concatenation 302 may be a string that includes a number of answers 306A-306C from an FAQ dataset. The concatenation 302 also includes separator special tokens 308. For example, the separator special tokens 308 may be used to separate answers 306A-306C from associated questions 310A, 310B, and 310C. The concatenation 302 further includes end-of-sequence [EOS] special tokens 312. For example, the [EOS] special tokens 312 may be used to separate answer-question pairs from each other. The concatenation 302 also shows randomly sampled sequences 316A, 316B, and 316C that may be used to train a GPT model to generate paraphrases. The paraphrase generation 304 includes a sampled answer 306D, a separator special token 308, and generated paraphrases 314A and 314B.

In the example of FIG. 3, the concatenation 302 may be used to fine-tune a GPT model to generate paraphrases corresponding to input answers. For example, the GPT model may be fine-tuned by sampling sequences of consecutive tokens in the concatenation 302 and maximizing a conditional probability of a word to appear next in the sequence. In various examples, the GPT fine-tuning samples a sequence of a predetermined number of/consecutive tokens from the text U and maximizes the conditional probability $P(w^j|w^{j-1}, \ldots w^{j-1})$ of $w^j$ to appear next in the sequence. A loss function may be used to maximize this conditional probability based on the actual word appearing next in the sequence. This sampling and maximization of the conditional probability may be repeated several times in order to generate a fine-tuned GPT model.

Once the GPT model is fine-tuned, an answer 306D may be fed into the fine-tuned GPT model along with a separator special token 308. The fine-tuned GPT model may then generate a number of paraphrases 314A and 314B. For example, the trained GPT can generate tokens until the EOS special token is reached. In some examples, all the generated tokens until the EOS special token may be used as a paraphrase to the associated question q of answer $a_i$ 306D. In various examples, any number of question paraphrases may be generated by repeating this generation process.

It is to be understood that the block diagram of FIG. 3 is not intended to indicate that the paraphrase generation 300 is to include all of the components shown in FIG. 3. Rather, the paraphrase generation 300 can include fewer or additional components not illustrated in FIG. 3 (e.g., additional answers, questions, special tokens, or additional generated paraphrases, etc.).

Figure 4:
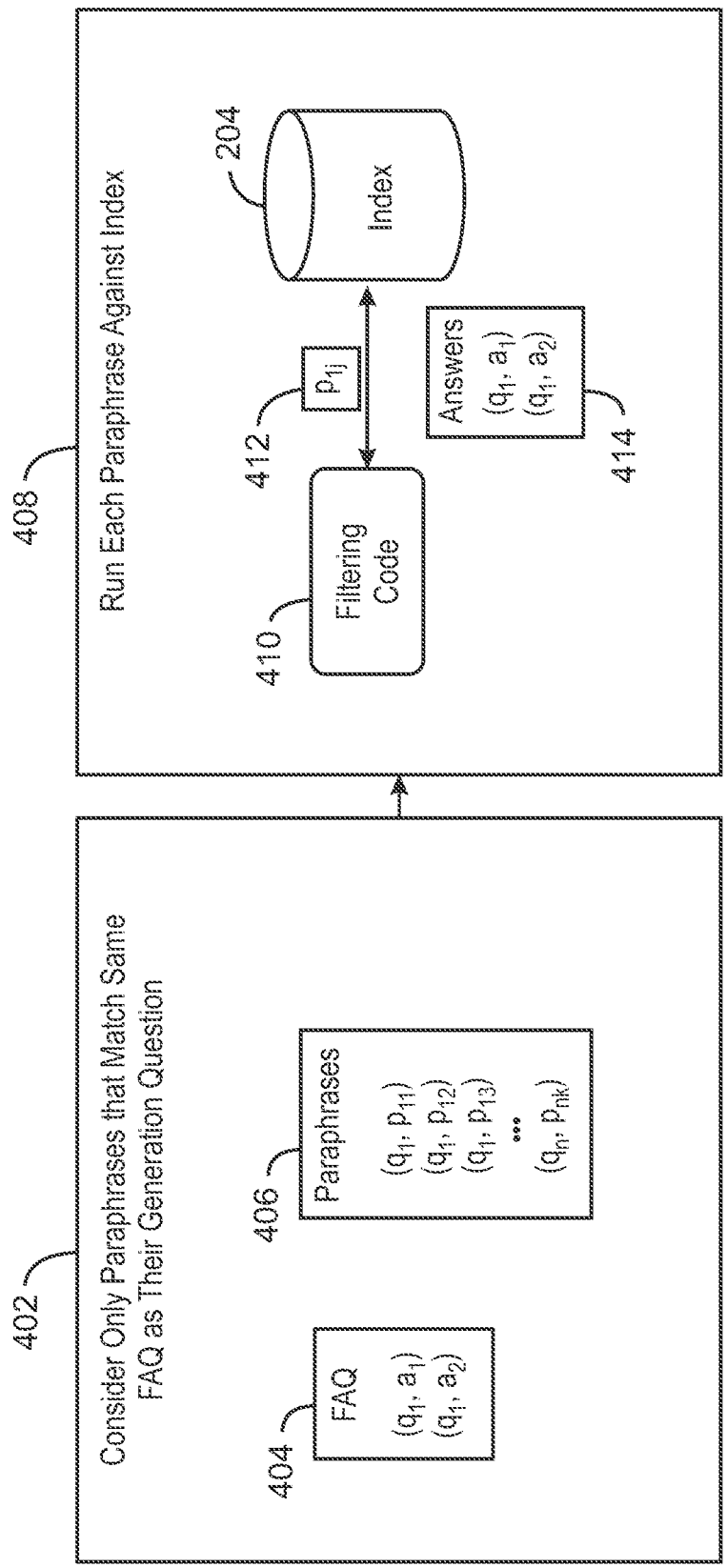
FIG. 4 is a process flow diagram of an example process for filtering question paraphrases.

FIG. 4 is a process flow diagram of an example process for filtering question paraphrases. The process 400 can be implemented using the method 600 of FIG. 6 via the processor 802 of the computing system 800 or the processor 1102 of the computer readable medium 1100 of FIGS. 8 and 11. For example, the process 400 may be used in the process 100 of FIG. 1.

At block 402, only paraphrases that match the same FAQ as their generation question are considered. Thus, paraphrases that do not match the same FAQ as their generation question are filtered out. In the example of FIG. 4, an FAQ dataset includes two pairs associated with the same question $q_1$, including pair $(q_1, a_1)$ and $(q_1, a_2)$. The paraphrases 406 may thus be filtered to use only paraphrases $p_{11}$, $p_{12}$, $p_{13}$, $p_{nk}$ that match the same question q1.

At block 408, a filtering code 410 is used to further filter the paraphrases 406 by running each paraphrase $p_{1j}$ against an index 204 and filter out paraphrases whose query results do not match the query results of question $q_1$. For example, each of the paraphrases $p_{11}$, $p_{12}$, $p_{13}$, $p_{nk}$ may be run as a query against the index 204. Only paraphrases that return one or more of the pairs $(q_1, a_1)$ and $(q_1, a_2)$ may be kept for training. In some examples, only paraphrases that return a minimum subset of possible answers as top results may be kept for training. In various examples, the paraphrases that pass this filter may be further sorted by the score of the top returned (q, a) pair, when run against the index 204.

Figure 5A:
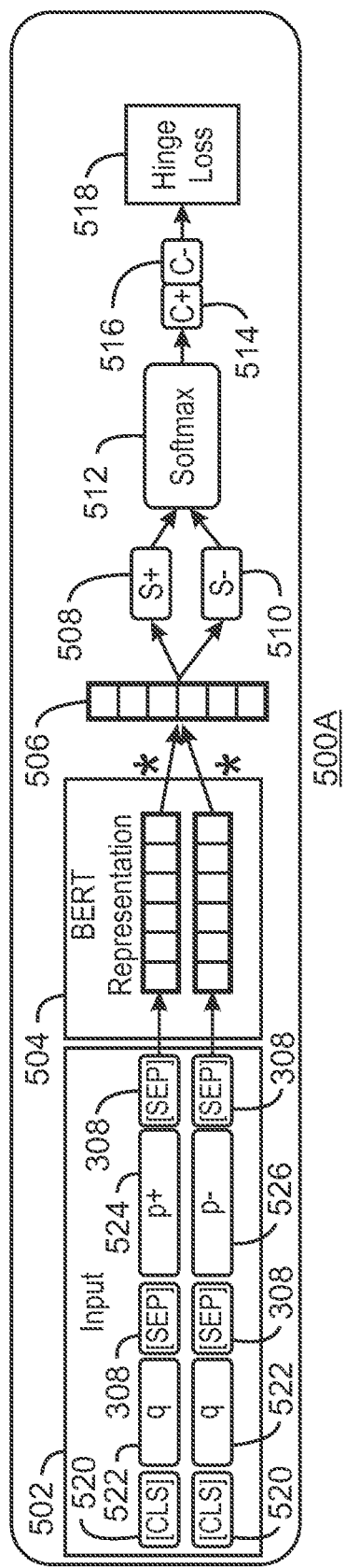
FIG. 5A is an example system for training a BERT Q-q model using triplets.

FIG. 5A is an example system for training a BERT Q-q model using triplets. The system 500A can be implemented using the process 100 and the method 600 of FIG. 1 and FIG. 6, via the processor 802 and trainer module 824 of FIG. 8, or via the processor 1102 and model tuner 1110 of FIG. 11.

The system 500A includes an input 502. The system 500A is shown generating a BERT representation 504 for the input 502. For example, the BERT representation 504 may include a pretrained representation of any suitable BERT model. The system 500A includes a vector 506 generated based on the BERT representation 504. For example, the vector 506 may be multiplied with the BERT representation 504. The system 500A includes scores resulting from the multiplication of S+ 508 and S− 510. The system 500A also includes a softmax function 512. The softmax function is a function that takes as input a vector of K real numbers, and normalizes the vector into a probability distribution consisting of K probabilities proportional to the exponentials of the input numbers For example, the softmax function 512 can normalize inputs such that the sum of the inputs is one. The softmax function 512 is shown generating normalized outputs C+ 514 and C− 516. The normalized output C+ 514 may indicate that the first pair (q, p+) is better and the normalized output C− 516 is the probability that the second pair (q, p−) is better. The system 500A also further includes a hinge loss 518 calculated based on the normalized outputs C+ 514 and C− 516. In some examples, the hinge loss 518 may be used to perform pair-wise learning to rank. For example, the hinge loss 518 may include a function that adjusts one or more weights of a network such that that C+ is relatively higher than C−. The input 502 includes a [CLS] special token 520 that stands for classification and indicates sentence-level classification. The input 502 further includes a question 522 and an associated positive paraphrase 526 and a negative paraphrase 528.

In the example of FIG. 5A, a BERT Q-q model is trained using triplets $(q, p^+, p^-)$, $(q, p^+)$, and $(q, p^-)$, where $p^+$ is a positive example of a paraphrase generated for question p and $p^-$ is a negative example of a paraphrase that is not associated with the answer to question p. For example, the negative example $p^-$ may have been generated for a different question $q_2$. In various examples, the negative example $p^-$ may have been filtered with respect to the different question $q_2$ using the filtering of FIG. 4. In various examples, the BERT Q-q model may be trained for a predetermined number of iterations. In some examples, the BERT Q-q model may be trained using a subset of the training data as a validation set and trained until the validation set results in an accuracy above a threshold accuracy.

It is to be understood that the block diagram of FIG. 5A is not intended to indicate that the system 500A is to include all of the components shown in FIG. 5A. Rather, the system 500A can include fewer or additional components not illustrated in FIG. 5A (e.g., additional inputs, functions, or additional losses, etc.).

Figure 5B:
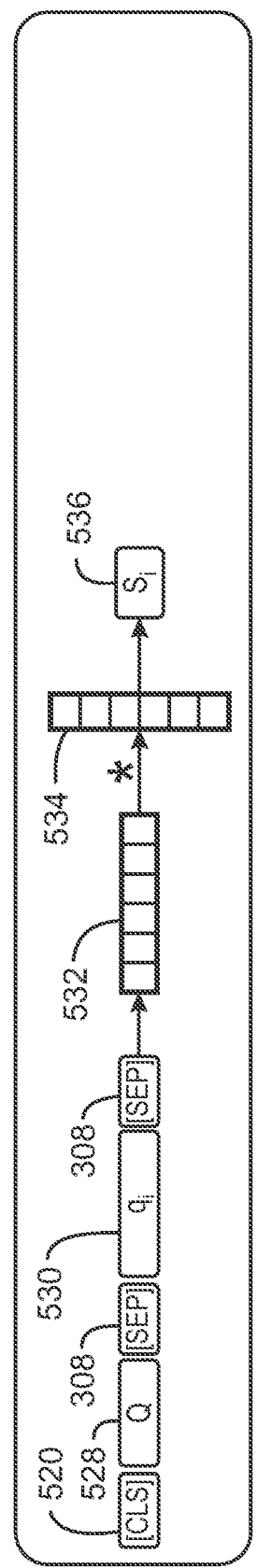
FIG. 5B is an example trained BERT Q-q model for ranking a set of questions based on a received query.

FIG. 5B is an example trained BERT Q-q model for ranking a set of questions based on a received query. The trainer trained BERT Q-q model 500B can be used in the system 200 of FIG. 2, the computing device 800 of FIG. 8 or the computer-readable medium 1100 of FIG. 11.

FIG. 5B includes elements of FIGS. 3 and 5A referred to using similar reference numbers. In addition, the trained BERT Q-q model 500B is shown receiving a string including a query Q 528 and a question $q_i$ 530 from the set of question-answer pairs of the FAQ dataset a separated by a separator special token 308. The trained BERT Q-q model 500B includes a representation 532 that may include one or more features generated from the received string including the query 528 and the question 530. For example, the representation 532 may be a BERT representation. The trained BERT Q-q model 500B includes a vector 534 that is multiplied with the representation 532. For example, the vector 534 may have been modified during training as described in the system 500A. The trained BERT Q-q model 500B includes an output score $S_i$ associated with the input query Q 528 and question $q_i$ 530.

In the example of FIG. 5, the trained BERT Q-q model 500B receives an input query Q 528 and question $q_i$ 530 at inference and outputs a corresponding score $S_i$ 536 that indicates how well the input query Q 528 matches the question $q_i$ 530. In various examples, the trained BERT Q-q model 500B receives additional questions from a set of candidate answer-question pairs returned by an index and calculates a score $S_i$ 536 for each candidate. In various examples, the resulting set of scores $S_i$ 536 may be used to re-rank the candidates. In some examples, the scores $S_i$ 536 may be combined with one or more additional scores generated for the candidates.

It is to be understood that the block diagram of FIG. 5B is not intended to indicate that the trained BERT Q-q model 500B is to include all of the components shown in FIG. 5B. Rather, the trained BERT Q-q model 500B can include fewer or additional components not illustrated in FIG. 5B (e.g., additional queries, questions, or additional scores, etc.).

Figure 6:
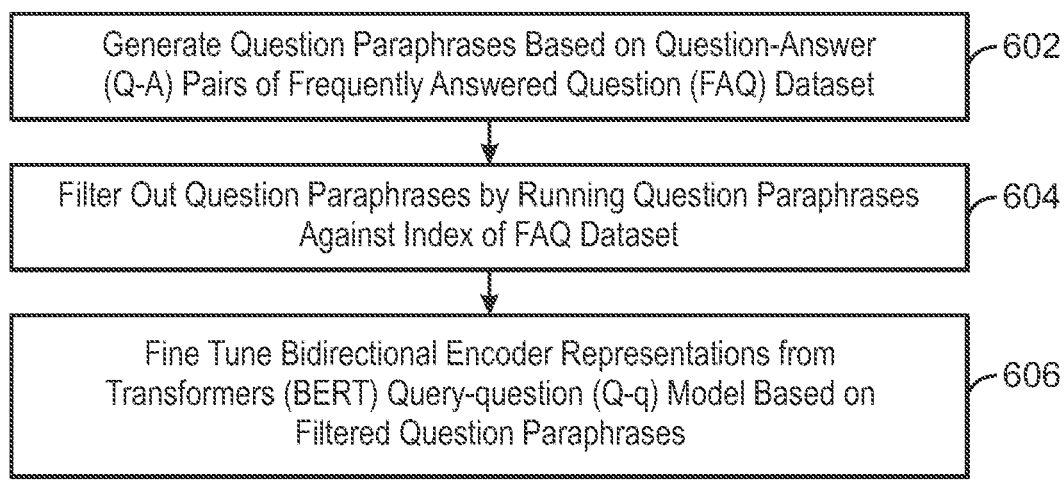
FIG. 6 is a block diagram of an example method that can fine-tune a BERT Q-q model on generated paraphrases of questions.

FIG. 6 is a process flow diagram of an example method that can fine-tune a BERT query-question model on generated paraphrases of questions. The method 600 can be implemented with any suitable computing device, such as the computing device 800 of FIG. 8 and is described with reference to the systems 100 of FIG. 1. For example, the methods described below can be implemented by the processor 802 of the computing system 800 or the processor 1102 of the computer readable medium 1100 of FIGS. 8 and 11.

At block 602, question paraphrases are generated based on question-answer pairs of an FAQ dataset. For example, the question-answer pairs of the FAQ dataset may be concatenated with special tokens. In some examples, the answer of each question-answer pair may precede the question of the question-answer pair. In various examples, the special tokens may include a separator special token and an end-of-sequence special token. A generative pretrained transformer may be trained on question-answer pairs of the FAQ dataset. The generative pretrained transformer may be fine-tuned using randomly sampled sequences of a concatenated FAQ dataset with special tokens. For example, the generative pretrained transformer may be fine-tuned using only the FAQ dataset as training input. In some examples, the question paraphrases may be title paraphrases, the question-answer pairs may be title-abstract pairs.

At block 604, the question paraphrases are filtered by running the question paraphrases against an index of the FAQ dataset. For example, question paraphrases may be selected that match a question-answer pair of the FAQ dataset including a question that was used to generate the selected question paraphrases. In some examples, the question paraphrases may be title paraphrases that are filtered by running the title paraphrases against an index of a set of documents.

At block 606, a Bidirectional Encoder Representations from Transformers (BERT) Query-question model is fine-tuned based on the filtered question paraphrases. In various examples, the BERT Q-q model may be trained using triplets including a question, a positive paraphrase, and a negative paraphrase. For example, the positive paraphrase may be a paraphrase from the filtered paraphrases generated for the question. The negative paraphrase may be a paraphrase generated for another question. In some examples, a BERT Q-t model may be fined-tuned based on filtered title paraphrases.

The process flow diagram of FIG. 6 is not intended to indicate that the operations of the method 600 are to be executed in any particular order, or that all of the operations of the method 600 are to be included in every case. Additionally, the method 600 can include any suitable number of additional operations.

Figure 7:
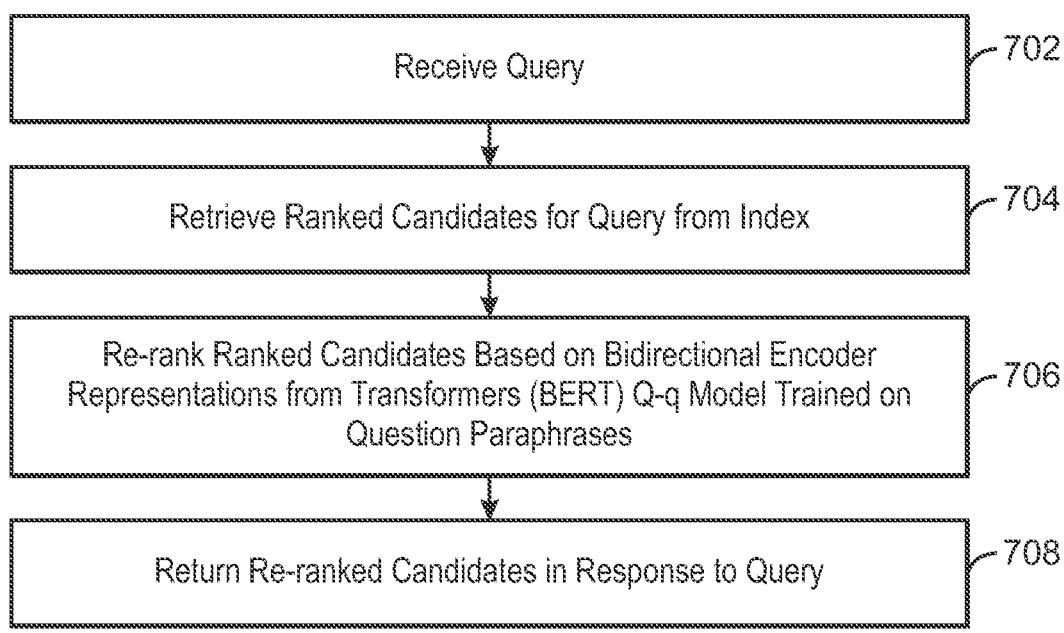
FIG. 7 is a block diagram of an example method that can re-rank query candidates using a BERT Q-q model trained on question paraphrases.

FIG. 7 is a process flow diagram of an example method that can re-rank query candidates using a BERT Q-q model trained on question paraphrases. The method 700 can be implemented with any suitable computing device, such as the computing device 800 of FIG. 8 and is described with reference to the system 200 of FIG. 2. In various examples, the method 700 can be implemented via the processor 802 of the computing device 800 of FIG. 8 or the processor 1102 of the computer-readable medium 1100 of FIG. 11.

At block 702, a query is received. For example, the query may be a new query received from a user to be matched to one or more question-answer pairs of an FAQ dataset. In some examples, the query may be a query for a particular document to be returned.

At block 704, ranked candidates are retrieved from an index based on the query. In some examples, the candidates may be ranked using a BM25 retrieval. For example, given a user query Q, the query Q is matched using BM25 similarity against a concatenated q+a field of an index and retrieve an initial pool of a predetermined number of top-k FAQ candidates.

At block 706, the ranked candidates are re-ranked using the Bidirectional Encoder Representations from Transformers (BERT) model. For example, the question from each of the candidates may be input into the trained BERT Q-q re-ranker along with the received query and a score generated for each candidate. In some examples, a title from each of the candidates may be input into a trained BERT Q-t re-ranker along with the received query and a score generated for each candidate.

At block 708, a re-ranked candidate is returned in response to the query. For example, a predetermined number of higher ranked re-ranked candidates may be returned and displayed in response to the query. In some examples, the re-ranked candidate may be a question-answer pair. In various examples, the re-ranked candidate may be a document.

The process flow diagram of FIG. 7 is not intended to indicate that the operations of the method 700 are to be executed in any particular order, or that all of the operations of the method 700 are to be included in every case. Additionally, the method 700 can include any suitable number of additional operations. For example, the method 700 may include performing a final re-ranking of the candidates by combining a number of re-rankers using an unsupervised late-fusion, wherein the number of re-rankers include the BERT Q-q model, a BERT query-answer (Q-a) model, and a passage-based re-ranker. In some examples, the unsupervised late-fusion may include summing candidate scores assigned for each candidate by the BERT Q-q model, a BERT query-answer (Q-a) model, and a passage-based re-ranker. In various examples, the unsupervised late-fusion may further include applying an unsupervised query expansion step for re-ranking a candidate pool of the summed candidate scores.

In some scenarios, the techniques described herein may be implemented in a cloud computing environment. As discussed in more detail below in reference to at least FIGS. 8-11, a computing device configured to re-rank query candidates using a BERT query-question model trained on question paraphrases may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
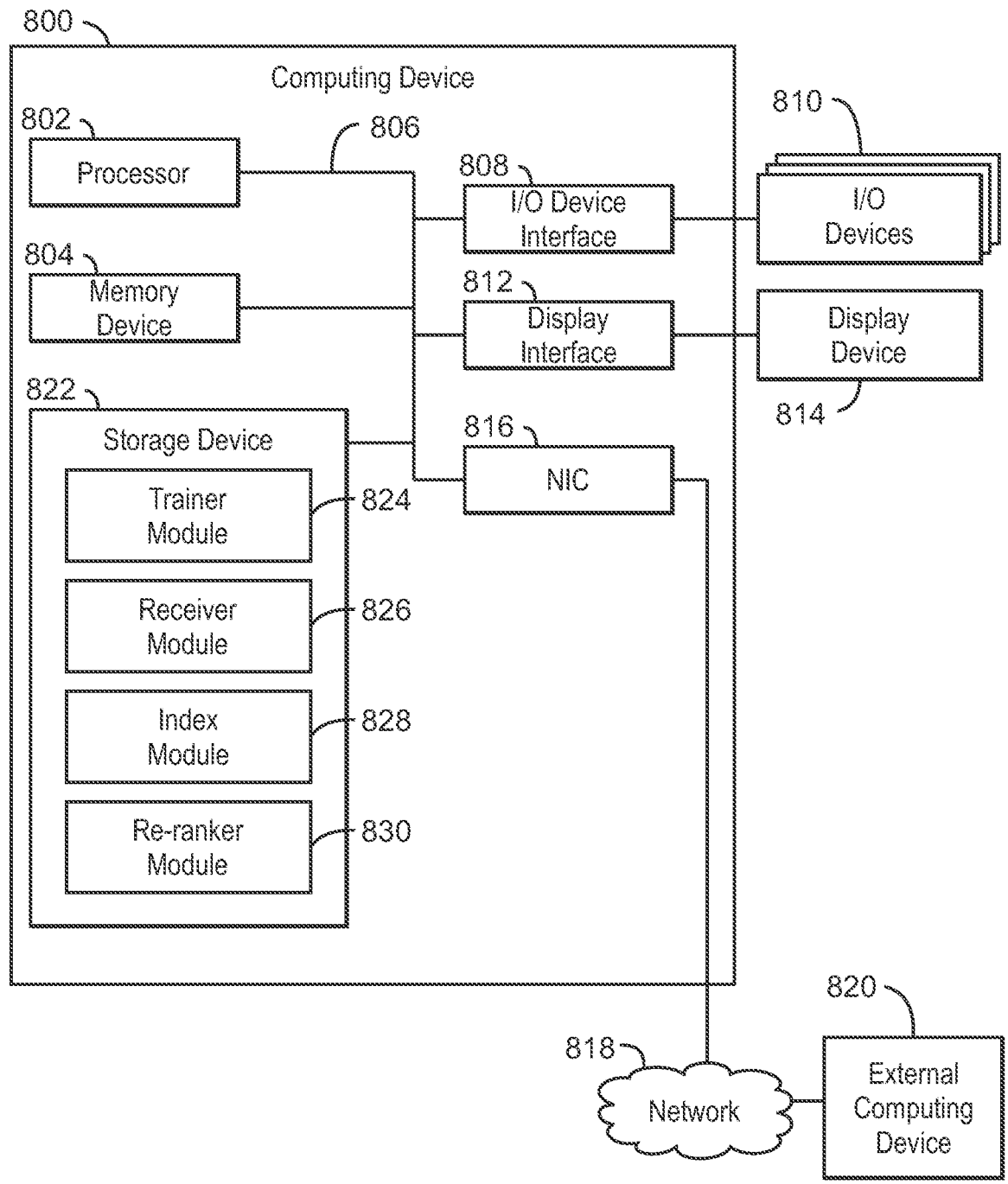
FIG. 8 is a block diagram of an example computing device that can re-rank query candidates using a BERT Q-q model trained on question paraphrases.

FIG. 8 is block diagram of an example computing device that can re-rank query candidates using a BERT query-question model trained on question paraphrases. The computing device 800 may be for example, a server, desktop computer, laptop computer, tablet computer, or smartphone. In some examples, computing device 800 may be a cloud computing node. Computing device 800 may be described in the general context of computer system executable instructions, such as program modules, being executed by a computer system. Generally, program modules may include routines, programs, objects, components, logic, data structures, and so on that perform particular tasks or implement particular abstract data types. Computing device 800 may be practiced in distributed cloud computing environments where tasks are performed by remote processing devices that are linked through a communications network. In a distributed cloud computing environment, program modules may be located in both local and remote computer system storage media including memory storage devices.

The computing device 800 may include a processor 802 that is to execute stored instructions, a memory device 804 to provide temporary memory space for operations of said instructions during operation. The processor can be a single-core processor, multi-core processor, computing cluster, or any number of other configurations. The memory 804 can include random access memory (RAM), read only memory, flash memory, or any other suitable memory systems.

The processor 802 may be connected through a system interconnect 806 (e.g., PCI®, PCI-Express®, etc.) to an input/output (I/O) device interface 808 adapted to connect the computing device 800 to one or more I/O devices 810. The I/O devices 810 may include, for example, a keyboard and a pointing device, wherein the pointing device may include a touchpad or a touchscreen, among others. The I/O devices 810 may be built-in components of the computing device 800, or may be devices that are externally connected to the computing device 800.

The processor 802 may also be linked through the system interconnect 806 to a display interface 812 adapted to connect the computing device 800 to a display device 814. The display device 814 may include a display screen that is a built-in component of the computing device 800. The display device 814 may also include a computer monitor, television, or projector, among others, that is externally connected to the computing device 800. In addition, a network interface controller (NIC) 816 may be adapted to connect the computing device 800 through the system interconnect 806 to the network 818. In some embodiments, the NIC 816 can transmit data using any suitable interface or protocol, such as the internet small computer system interface, among others. The network 818 may be a cellular network, a radio network, a wide area network (WAN), a local area network (LAN), or the Internet, among others. An external computing device 820 may connect to the computing device 800 through the network 818. In some examples, external computing device 820 may be an external webserver 820. In some examples, external computing device 820 may be a cloud computing node.

The processor 802 may also be linked through the system interconnect 806 to a storage device 822 that can include a hard drive, an optical drive, a USB flash drive, an array of drives, or any combinations thereof. In some examples, the storage device may include a trainer module 824, a receiver module 826, an index module 828, and a re-ranker module 830. The trainer module 824 can receive an indexed FAQ dataset and fine-tune a pretrained BERT Q-q model using paraphrases generated for the questions in the FAQ dataset. In some examples, the paraphrases are filtered to match the same FAQ as their generation questions using the index. In various examples, the trainer module 824 can train the BERT Q-q model using triplets including a question, a positive paraphrase, and a negative paraphrase. In some examples, the trainer module 824 can train a BERT Q-t model using triplets including a title, a positive paraphrase of the title, and a negative paraphrase of the title. The receiver module 826 can receive a query. For example, the query may be a search query for an answer to a question. In some examples, the query may be a search query for a document. The index module 828 can retrieve ranked candidates from an index based on the query. The re-ranker module 830 can re-rank the ranked candidates using a Bidirectional Encoder Representations from Transformers (BERT) query-question (Q-q) model trained to match queries to questions of a frequently asked question (FAQ) dataset. For example, the BERT Q-q model may be fine-tuned using paraphrases generated for the questions in the FAQ dataset. In some examples, the re-ranker module 830 can re-rank the ranked candidates using a BERT query-title (Q-t) model trained to match queries to titles of documents in a document dataset. In some examples, the ranker module 830 can return the re-ranked candidates in response to the query. In various examples, the ranker module 830 can perform a final re-ranking of the candidates by combining a number of re-rankers using an unsupervised late-fusion. For example, the number of re-rankers may include the BERT Q-q model, a BERT query-answer (Q-a) model, and a passage-based re-ranker. In some examples, the number of re-rankers may include a BERT Q-t model, a BERT query-abstract model, and an information retrieval based re-ranker. For example, the ranker module 830 can sum candidate scores assigned for each candidate by the BERT Q-q model, a BERT query-answer (Q-a) model, and a passage-based re-ranker. In some examples, the ranker module 830 can also apply an unsupervised query expansion step for re-ranking a candidate pool of the summed candidate scores.

It is to be understood that the block diagram of FIG. 8 is not intended to indicate that the computing device 800 is to include all of the components shown in FIG. 8. Rather, the computing device 800 can include fewer or additional components not illustrated in FIG. 8 (e.g., additional memory components, embedded controllers, modules, additional network interfaces, etc.). For example, the computing device 800 may include a re-ranked candidate retriever to return the re-ranked candidates in response to the query. Furthermore, any of the functionalities of the trainer module 824, the receiver module 826, the index module 828, and the re-ranker module 830, may be partially, or entirely, implemented in hardware and/or in the processor 802. For example, the functionality may be implemented with an application specific integrated circuit, logic implemented in an embedded controller, or in logic implemented in the processor 802, among others. In some embodiments, the functionalities of the trainer module 824, the receiver module 826, the index module 828, and the re-ranker module 830 can be implemented with logic, wherein the logic, as referred to herein, can include any suitable hardware (e.g., a processor, among others), software (e.g., an application, among others), firmware, or any suitable combination of hardware, software, and firmware.

Figure 9:
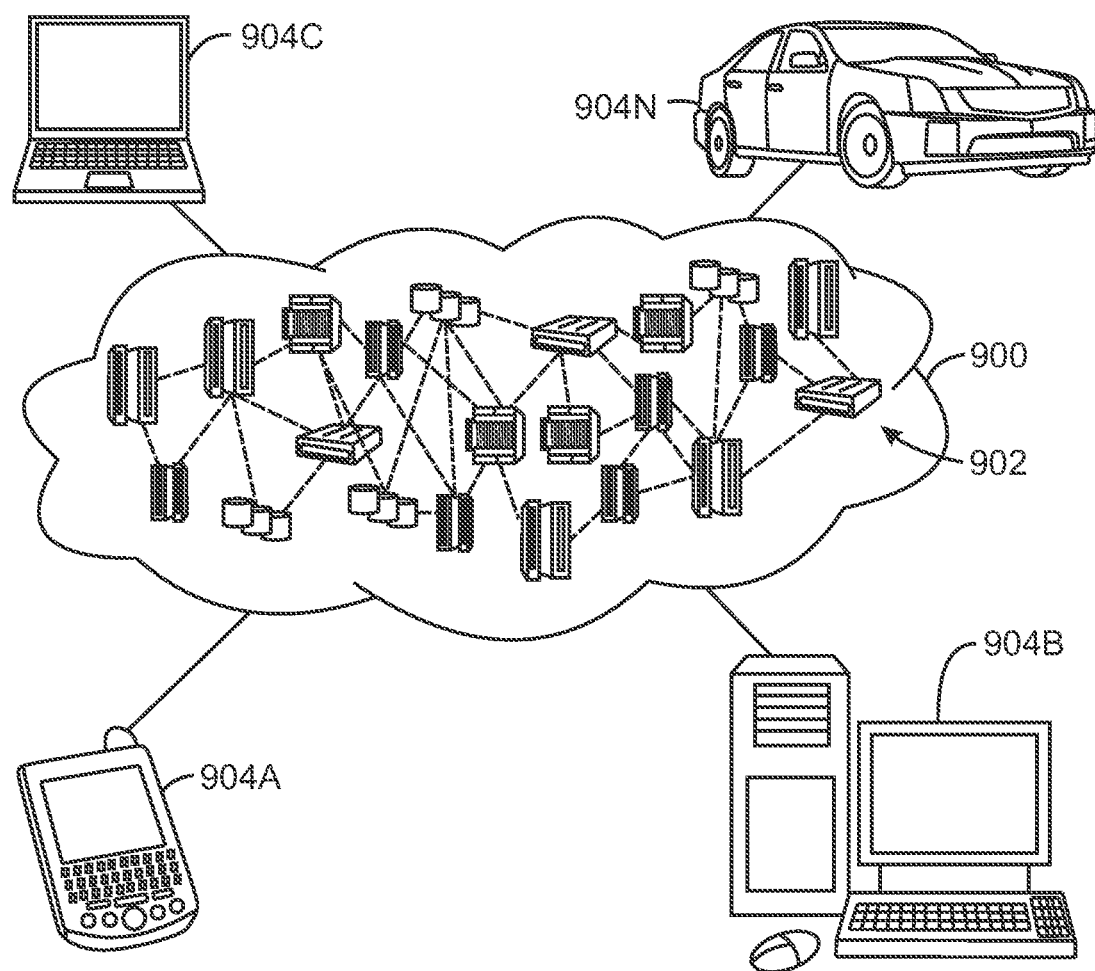
FIG. 9 is a diagram of an example cloud computing environment according to embodiments described herein.

Referring now to FIG. 9, illustrative cloud computing environment 900 is depicted. As shown, cloud computing environment 900 comprises one or more cloud computing nodes 902 with which local computing devices used by cloud consumers, such as, for example, personal digital assistant (PDA) or cellular telephone 904A, desktop computer 904B, laptop computer 904C, and/or automobile computer system 904N may communicate. Nodes 902 may communicate with one another. They may be grouped (not shown) physically or virtually, in one or more networks, such as Private, Community, Public, or Hybrid clouds as described hereinabove, or a combination thereof. This allows cloud computing environment 900 to offer infrastructure, platforms and/or software as services for which a cloud consumer does not need to maintain resources on a local computing device. It is understood that the types of computing devices 904A-N shown in FIG. 9 are intended to be illustrative only and that computing nodes 902 and cloud computing environment 900 can communicate with any type of computerized device over any type of network and/or network addressable connection (e.g., using a web browser).

Figure 10:
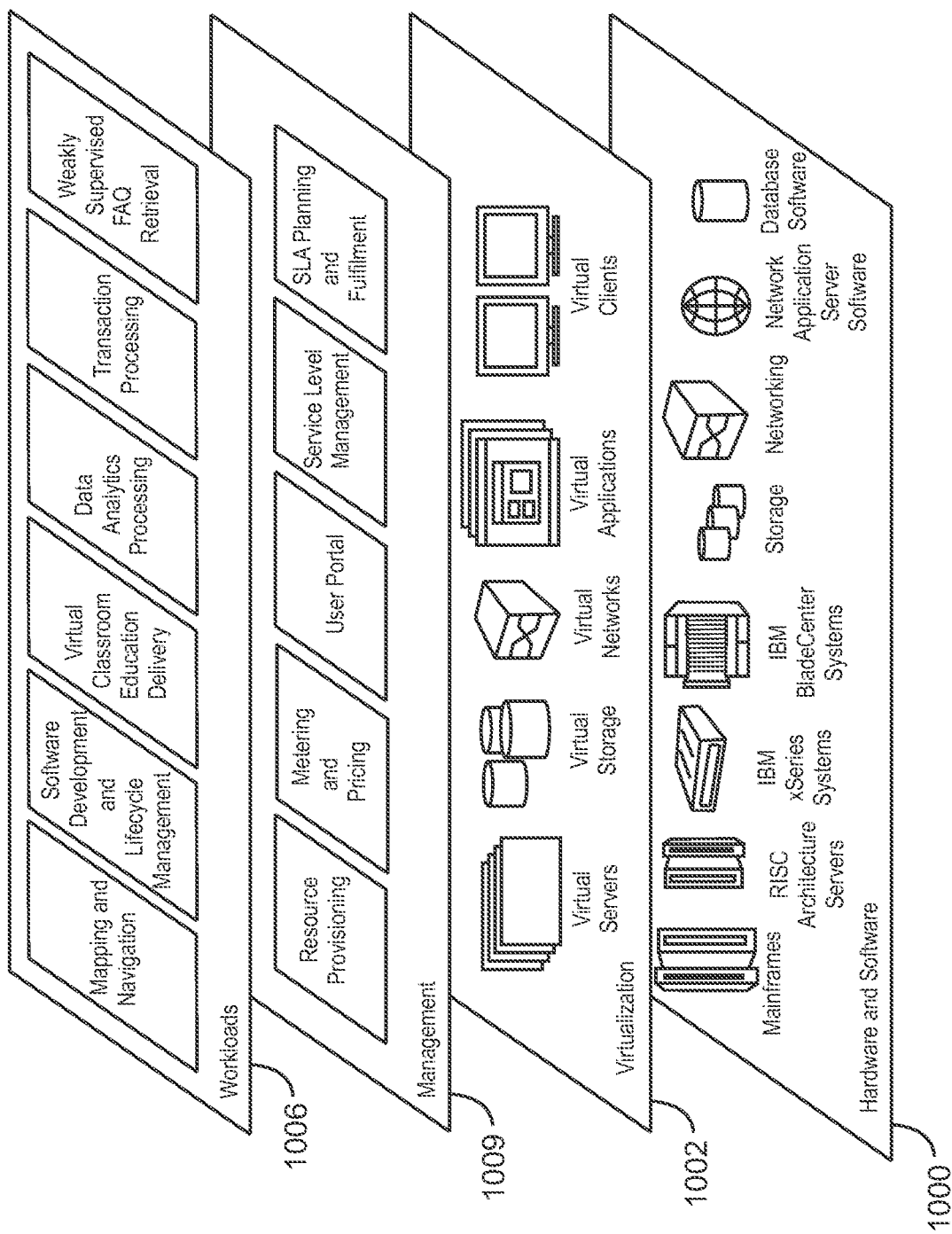
FIG. 10 is a diagram of an example abstraction model layers according to embodiments described herein.

Referring now to FIG. 10, a set of functional abstraction layers provided by cloud computing environment 900 (FIG. 9) is shown. It should be understood in advance that the components, layers, and functions shown in FIG. 10 are intended to be illustrative only and embodiments of the invention are not limited thereto. As depicted, the following layers and corresponding functions are provided.

Hardware and software layer 1000 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1002 provides an abstraction layer from which the following examples of virtual entities may be provided: virtual servers; virtual storage; virtual networks, including virtual private networks; virtual applications and operating systems; and virtual clients. In one example, management layer 1004 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1006 provides examples of functionality for which the cloud computing environment may be utilized. Examples of workloads and functions which may be provided from this layer include: mapping and navigation; software development and lifecycle management; virtual classroom education delivery; data analytics processing; transaction processing; and weakly supervised FAQ retrieval.

The present invention may be a system, a method and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function or act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 11:
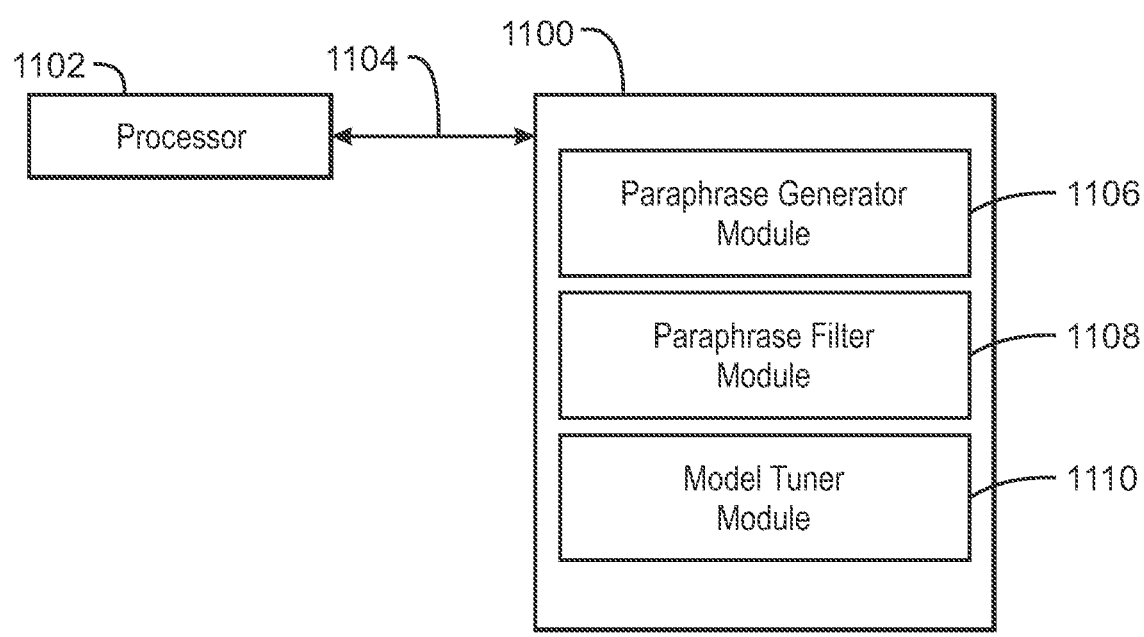
FIG. 11 is an example tangible, non-transitory computer-readable medium that can re-rank query candidates using a BERT query-question model trained on question paraphrases.

Referring now to FIG. 11, a block diagram is depicted of an example tangible, non-transitory computer-readable medium 1100 that can re-rank query candidates using a BERT query-question model trained using question paraphrases. The tangible, non-transitory, computer-readable medium 1100 may be accessed by a processor 1102 over a computer interconnect 1104. Furthermore, the tangible, non-transitory, computer-readable medium 1100 may include code to direct the processor 1102 to perform the operations of the methods 600 and 700 of FIGS. 6 and 7.

The various software components discussed herein may be stored on the tangible, non-transitory, computer-readable medium 1100, as indicated in FIG. 11. For example, a paraphrase generator 1106 includes code to generate question paraphrases based on question-answer pairs of a frequently asked question (FAQ) dataset. The module 1106 includes code to generate the question paraphrases using only the FAQ dataset as training input. In some examples, the module 1106 includes code to generate title paraphrases using only documents with as input. A paraphrase filter module 1108 includes code to filter the question paraphrases by running the question paraphrases against an index. In some examples, the paraphrase filter module 1108 includes code to filter title paraphrases by running the question paraphrases against an index of documents. The paraphrase filter module 1108 further includes code to train a generative pretrained transformer on question-answer pairs of the FAQ dataset. In some examples, the paraphrase filter module 1108 includes code to train a generative pretrained transformer on title-abstract pairs of the document dataset. The paraphrase filter module 1108 also includes code to fine-tune the generative pretrained transformer using randomly sampled sequences of a concatenated FAQ dataset with special tokens. In some examples, the paraphrase filter module 1108 also includes code to select generated question paraphrases that match a question-answer pair of the FAQ dataset that includes a question that was used to generate the selected question paraphrases. A model tuner module 1110 includes code to fine-tune a Bidirectional Encoder Representations from Transformers (BERT) Query-question (Q-q) model based on the filtered paraphrases. The module 1110 also includes code to train the BERT Q-q model using triplets including a question, a positive paraphrase, and a negative paraphrase. In some examples, the model tuner module 1110 includes code to fine-tune a BERT Q-t model based on filtered paraphrases of titles. It is to be understood that any number of additional software components not shown in FIG. 11 may be included within the tangible, non-transitory, computer-readable medium 1100, depending on the particular application. For example, the computer-readable medium 1100 may include a receiver module to receive a query. In some example, the computer-readable medium 1100 may include an index module to retrieve ranked candidates from an index based on the query. In various examples, the computer-readable medium 1100 may include a BERT Q-q model module to re-rank the ranked candidates. The computer-readable medium 1100 may include a display module to return a re-ranked candidate in response to the query.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 11 may be included within the tangible, non-transitory, computer-readable medium 1100, depending on the specific application. In some examples, the tangible, non-transitory, computer-readable medium 1100 may include code to retrieve document. For example, the question paraphrases may be title paraphrases, the question-answer pairs may be title-abstract pairs. In various examples, fine-tuning the BERT Q-q model is based on filtered title paraphrases. For example, the BERT Q-q model may be replaced with a BERT Q-t model as described herein.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
receive a query;
retrieve ranked candidates from an index based on the query;
fine-tune a generative pretrained transformer trained on question-answer pairs of a concatenated frequently asked question (FAQ) dataset using randomly sampled sequences of the concatenated FAQ dataset;
automatically generate paraphrases for questions in the FAQ dataset via the fine- tuned generative pretrained transformer based on input answers from the FAQ dataset;
filter the automatically generated paraphrases to match a same FAQ as their generation questions using the index;
fine-tune a Bidirectional Encoder Representations from Transformers (BERT) query-question (Q-q) model using the filtered generated paraphrases to match queries to questions of the FAQ dataset;
re-rank the ranked candidates using the fine-tuned BERT Q-q model; and
return the re-ranked candidates in response to the query.

2. The system of claim 1, wherein the Q-q BERT model is trained using triplets comprising a question, a positive paraphrase, and a negative paraphrase.

3. The system of claim 1, wherein the processor is to re-rank the ranked candidates using a final re-ranking of the candidates by combining a plurality of re-rankers using an unsupervised late-fusion, wherein the plurality of re-rankers comprise the fine-tuned BERT Q-q model, a BERT query-answer (Q-a) model, and a passage-based re-ranker.

4. The system of claim 3, wherein the unsupervised late-fusion comprises summing candidate scores assigned for each candidate by the fine-tuned BERT Q-q model, a BERT query-answer (Q-a) model, and a passage-based re-ranker.

5. The system of claim 4, wherein the unsupervised late-fusion comprises applying an unsupervised query expansion step for re-ranking a candidate pool of the summed candidate scores.

6. A computer-implemented method, comprising:
receiving, via a processor, a query;
retrieving, via the processor, ranked candidates from an index based on the query;
fine-tuning, via the processor, a generative pretrained transformer trained on question-answer pairs of a concatenated frequently asked question (FAQ) dataset using randomly sampled sequences of the concatenated FAQ dataset;
automatically generating, via the processor, question paraphrases via the fine-tuned generative pretrained transformer based on input answers from the FAQ dataset;
filtering, via the processor, the automatically generated question paraphrases to match a same FAQ as their generation questions using the index by running the question paraphrases against the index of the FAQ dataset;
fine-tuning, via the processor, a Bidirectional Encoder Representations from Transformers (BERT) query-question (Q-q) model based on the filtered generated question paraphrases to match queries to questions of the FAQ dataset;

re-ranking, via the processor, the ranked candidates using the fine-tuned BERT Q- q model; and returning, via the processor, the re-ranked candidates in response to the query.

7. The computer-implemented method of claim 6, wherein fine-tuning the generative pretrained transformer using randomly sampled sequences of the concatenated FAQ dataset with special tokens.

8. The computer-implemented method of claim 6, wherein generating the question paraphrases comprises using only the FAQ dataset as training input.

9. The computer-implemented method of claim 6, wherein the question paraphrases comprise title paraphrases, the question-answer pairs comprise title-abstract pairs, and wherein the BERT Q-t model is fined-tuned based on filtered title paraphrases.

10. A computer program product for ranking query candidates, the computer program product comprising a computer-readable storage medium having program code embodied therewith, wherein the computer-readable storage medium is not a transitory signal per se, the program code executable by a processor to cause the processor to:

receive a query;

retrieve ranked candidates from an index based on the query;

fine-tune a generative pretrained transformer trained on question-answer pairs of a concatenated frequently asked question (FAQ) dataset using randomly sampled sequences of the concatenated FAQ dataset;

automatically generate question paraphrases for questions in the FAQ dataset via the fine-tuned generative transformer based on input answers from the FAQ dataset;

filter the automatically generated question paraphrases to match a same FAQ as their generation questions using the index by running the question paraphrases against the index;

fine-tune a Bidirectional Encoder Representations from Transformers (BERT) Query-question (Q-q) model based on the filtered generated paraphrases to match queries to questions of the FAQ dataset;

re-rank the ranked candidates using the fine-tuned BERT Q-q model; and return the re-ranked candidates in response to the query.

11. The computer program product of claim 10, further comprising program code executable by the processor to fine-tune the generative pretrained transformer using the randomly sampled sequences of the concatenated FAQ dataset with special tokens.

12. The computer program product of claim 10, further comprising program code executable by the processor to generate the question paraphrases using only the FAQ dataset as training input.

13. The computer program product of claim 10, wherein the question paraphrases comprise title paraphrases, the question-answer pairs comprise title-abstract pairs, and wherein fine-tuning the BERT Q-q model is based on filtered title paraphrases.

14. The system of claim 1, wherein the processor is to further input a special token with each answer into the fine-tuned generative pretrained transformer, wherein the fine-tuned generative pretrained transformer generates tokens until the special token is reached and all the generated tokens are used as an automatically generated question paraphrase for the answer.

\* \* \* \* \*